C. F. BALL.
ROTARY MEAT CAKE CUTTER.
APPLICATION FILED AUG. 21, 1917.

1,280,100.

Patented Sept. 24, 1918.
2 SHEETS—SHEET 1.

Inventor:
Charlie F. Ball
by attorneys

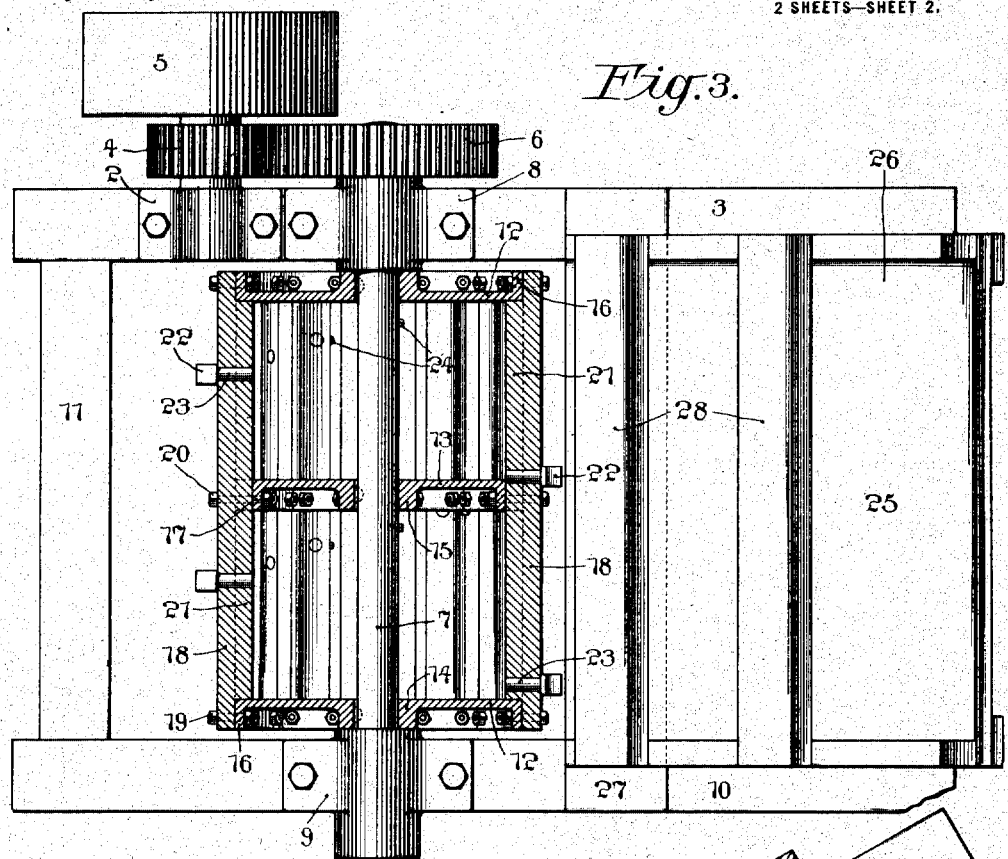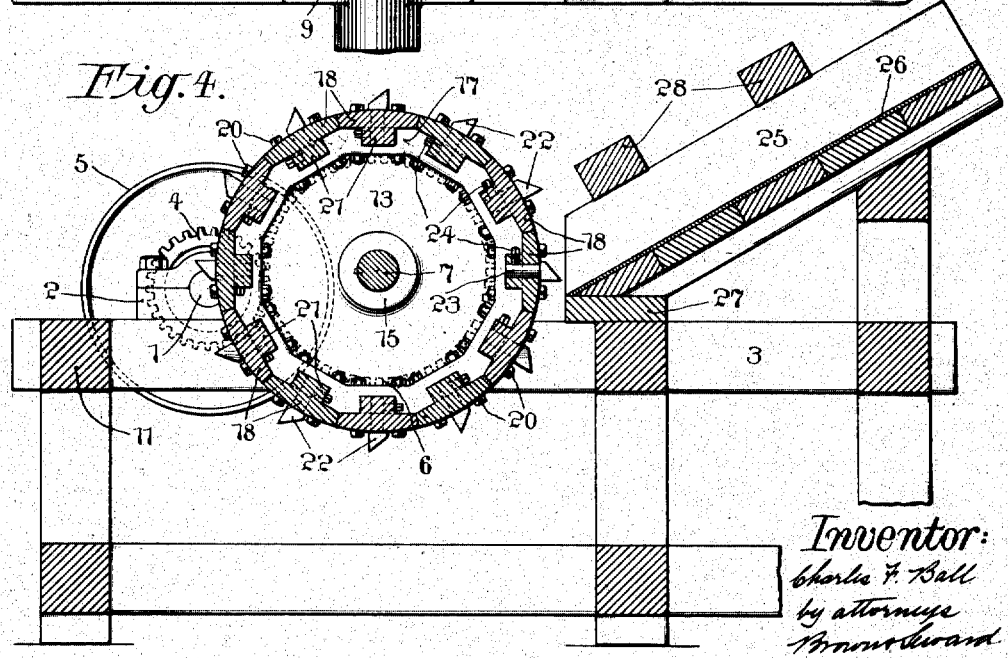

UNITED STATES PATENT OFFICE.

CHARLES F. BALL, OF NEW YORK, N. Y., ASSIGNOR TO BALL & JEWELL, OF BROOKLYN, NEW YORK, A FIRM.

ROTARY MEAT-CAKE CUTTER.

1,280,100. Specification of Letters Patent. Patented Sept. 24, 1918.

Application filed August 21, 1917. Serial No. 187,443.

*To all whom it may concern:*

Be it known that I, CHARLES F. BALL, a citizen of the United States, and resident of the borough of Queens, in the city and State of New York, have invented a new and useful Improvement in Rotary Meat-Cake Cutters, of which the following is a specification.

There has been much difficulty in suitably breaking up compressed meat cakes owing to the extreme hardness and toughness of the cakes.

Furthermore, in breaking up these cakes the implements used are rapidly dulled and frequently broken.

The objects of my invention are to produce a machine in which the cakes may be uniformly broken up with a minimum expenditure of power and in which a very strong built-up cylindrical cutter head is provided, the staves which carry the cutters being removable and the cutters themselves being removable.

Further features of my invention are the provision of a hard metal striker block for the cutters and the means for preventing the cakes from jumping when being acted upon by the cutters, and the ample separation and spiral arrangement of the cutters whereby the cake is acted upon by only one or two cutters at a time thus securing a progressive and uniform breaking up of the cake and requiring a relatively small amount of power to accomplish this result.

A practical embodiment of my invention is represented in the accompanying drawings, in which—

Fig. 3 represents the machine partly in top plan and partly in section, and

Fig. 4 represents the machine in longitudinal vertical section, taken in the plane of the line IV—IV of Fig. 1, looking in the direction of the arrows.

Figure 1:
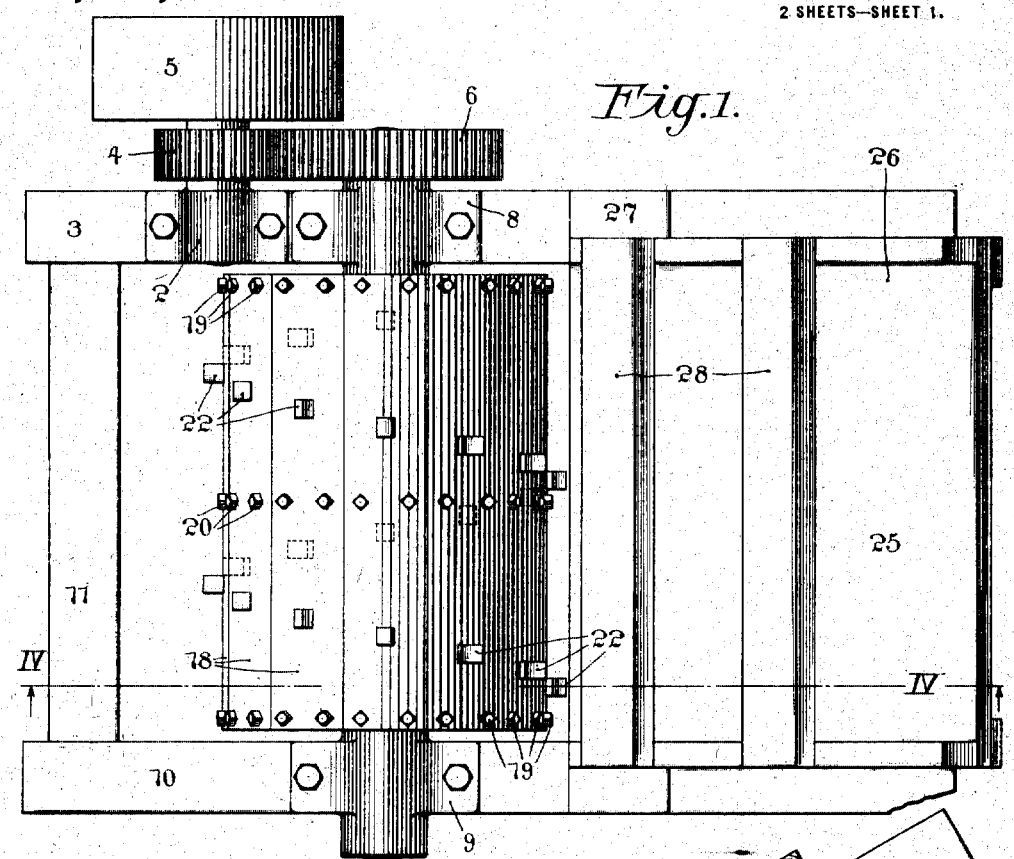
Figure 1 represents the machine in top plan.
Figure 2:
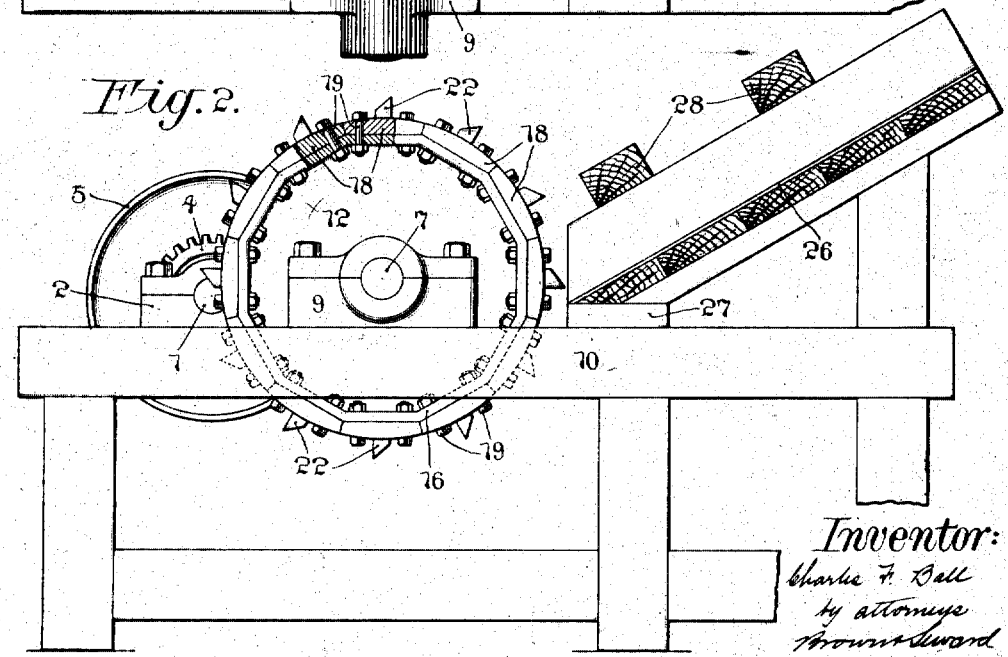
Fig. 2 represents the machine in end elevation.

The drive shaft 1 is mounted in a suitable bearing 2 on one of the side frames 3 of a machine, which shaft carries a gear 4 and the drive pulley 5.

The gear 4 meshes with a gear 6 fast on the cutter shaft 7, which cutter shaft is mounted in suitable bearings 8, 9, on the side frames 3 and 10, of the machine. The side frames 3 and 10 are rigidly united by cross beams 11 at suitable points.

The cylindrical cutter head includes the end disks 12 and one or more intermediate disks 13. The end disks 12 have hubs 14 surrounding and keyed to the cutter shaft 7. The intermediate disk 13 is also provided with a hub 15 surrounding and keyed to the cutter shaft 7. The end disks 12 are further provided with peripheral flanges 16 and the intermediate disks 13 with a peripheral flange 17.

A plurality of contiguous longitudinally arranged staves 18 are removably secured at their ends to the flanges 16 of the end disks 12 by bolts 19 and they are also preferably secured to the flange 17 of the intermediate disk by bolts 20. These staves are provided with longitudinal interior strengthening ribs 21 extending between the end disks 12 and passing through the peripheral flanges of the intermediate disk 13.

The cutter head is provided with a spiral row of separated cutters 22. These cutters are removably secured to their respective staves by providing the staves with holes for the reception of the shanks 23 of the cutters, set screws 24 being carried by the ribs 21 for impinging against the shanks 23 to clamp them in position.

It is intended that these cutters 22 shall be so widely separated both circumferentially and longitudinally of the cutter head that each longitudinal stave 18 will carry only one or two of these cutters.

An inclined cake trough 25 is suitably mounted on the machine frame, which trough may be provided with a suitable metal bottom 26 and at its inner end I provide a hard metal striker plate 27 arranged to coact with the cutters when the machine is in operation.

To prevent the cake from jumping when the cutters are in operation, I provide retaining cross bars 28 bridging the staves between the sides of the trough, it being intended that the sides shall be in height substantially the thickness of the cakes in connection with which the machine is to be used.

In operation, it will be seen that by widely separating the cutters and arranging them in a spiral row around the cutter head, only one or two cutters will be engaged with the cake thus producing a gradual and even breaking off of the fragments without requiring too much power.

As any of the cutters become too dull or become broken or worn out, they may be readily replaced by the stave which carries the said cutters, may be unbolted from the disks and removed, thus permitting access to the set screws for releasing the cutters.

While I have described this machine as a meat cake cutter, it is obvious that it may be used for cutting cakes of any hard material.

It is evident that changes may be resorted to in the form, construction and arrangement of the several parts without departing from the spirit and scope of my invention; hence I do not wish to limit myself strictly to the structure herein set forth, but

What I claim is:

In a rotary hard cake cutter, a shaft, a cylindrical cutter head thereon comprising end and intermediate disks, said disks having laterally projecting flanges, a plurality of contiguous longitudinally arranged staves removably secured to the flanges of the said disks, the staves having inner longitudinal ribs which abut the end disks, and are let into the intermediate disk, and a series of cutters carried by said staves and removably secured thereto.

In testimony that I claim the foregoing as my invention I have signed my name this 16th day of July, 1917.

CHARLES F. BALL.

Copies of this patent may be obtained for five cents each, by addressing the "Commissioner of Patents, Washington, D. C."